Oct. 3, 1944.　　　A. I. D. TAYLOR　　　2,359,496

FROST SHIELD

Filed May 24, 1943

Inventor

ALEXANDER INNES DOBBIN TAYLOR.

by　　　W. Jarvis Haskett.
　　　　　　　　　Attorney.

Patented Oct. 3, 1944

2,359,496

UNITED STATES PATENT OFFICE 2,359,496

FROST SHIELD

Alexander Innes Dobbin Taylor, Outlook, Saskatchewan, Canada

Application May 24, 1943, Serial No. 488,283

3 Claims. (Cl. 296—95)

This invention relates to improvements in a frost shield for motor vehicles and the like and appertains particularly to one involving the principle of a dead air space between two transparent members.

An object of the invention is to provide a clear vision shield, of the so-called "dead air type," that once installed by a mechanic can be easily and quickly applied or removed by any motorist when needed, or for cleaning, etc.

A further object of the invention is to provide a clear vision, frost shield, as for the windshield of a motor car, having new and improved attaching means of a substantially universal type, adaptable to the windshield, rear or non-sliding side windows of almost any make of car.

A further object of the invention is to provide a frost shield attaching means in the form of a prefabricated strip of metal, plastic or the like adapted for semi-permanent connection to the frame, moulding or adjacent finishing strip about the windshield or some equivalent part and having adjustable means for pressing the removable auxiliary frost shield toward the regular windshield glass.

A still further object of the invention is the provision of a frost shield attaching means of the nature and for the purposes described that is characterized by structural simplicity, increased efficiency and low cost of production, being thereby rendered commercially desirable.

To the accomplishment of these and related objects, as shall become apparent as the description proceeds, the invention resides in the construction, combination and arrangement of parts as shall be hereinafter more fully described, illustrated in the accompanying drawing and pointed out in the claims hereunto appended.

The invention will be best understood and can be more clearly described when reference is had to the drawing forming a part of this disclosure wherein like characters indicate like parts throughout the several views.

Figure 1:
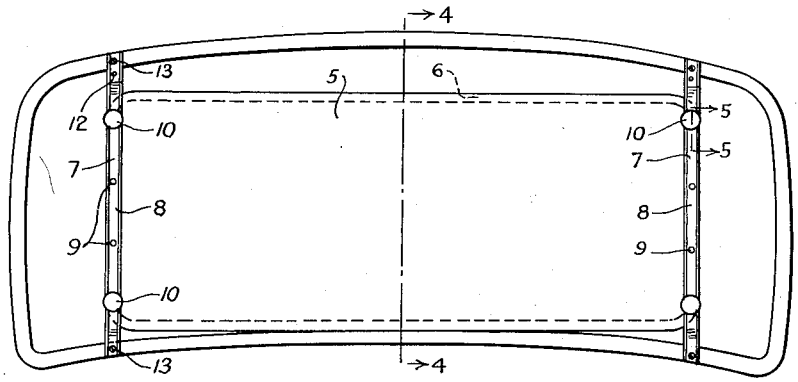
Figure 1 is an elevation of the inside of a conventional motor car windshield; with my frost shield applied thereto.
Figure 2:
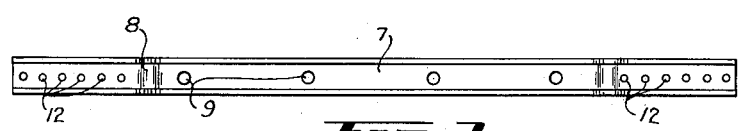
Figures 2 and 3 are a plan and elevation respectively of the instant universal attaching strip.
Figure 3:
Figures 4, 5:
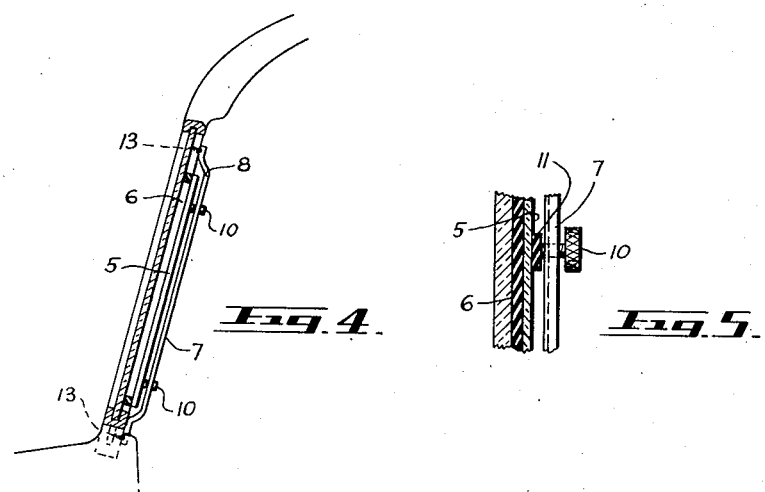
Figure 4 is a vertical section of Figure 1, taken on the line 4—4.
Figure 5 is an enlarged sectional detail, as taken on line 5—5 of Figure 1.

The present methods of attaching winter frost shields by sticky tape, sticky sponge rubber, suction cups, etc., are tedious and call for careful installation in a warm place, with a thoroughly clean and dry windshield. My frost shield can be quickly installed by any garage mechanic to give perfect satisfaction and enable the motorist to insert or remove the auxiliary glass to clean the same or whenever desired, by simply loosening a few pressure-applying thumb-screws.

The invention consists essentially in a frost-proof shield, visor, auxiliary glass or the like designated 5, a spacing member that may serve as a sealing strip 6, of sponge rubber or the equivalent applied to one side of the shield 5 around its edges, and a pair of attaching strips 7.

These attaching strips 7 are designed for substantially universal mounting on most any motor car windshield. To obtain the airproof seal desired between the windshield glass and the auxiliary frost shield they should be made rigid and so are preferably formed in some reinforced cross-sectional shape as channels, as shown. Each attaching strip or channel 7 is about 18" long and centrally offset to the hollow side of the channel for about ⅗ of its length, as indicated by the reference numeral 8. A number of equally spaced, threaded perforations 9 occur in the base of the channel in this offset portion 8 for selective inserting in any two of which are a pair of knurled thumb-screws 10 with rubber cushions or cups 11 on their inner ends. The both ends of the channel strip 7, beyond the offset 8, are drilled with a row of closely spaced perforations 12 designed to take a sheet metal screw 13.

In applying these universal attaching strips 7, the unwanted length at either or both ends that protrudes beyond the windshield frame or moulding is cut off. The moulding is then marked and drilled and the opposite ends of each of two properly spaced strips 7 securely and semipermanently mounted on the windshield frame with the offset 8, extending for substantially the height of the windshield and the channel facing the driver.

Under these offsets, the auxiliary glass or frost shield 5 is inserted, with its edge sealing strip 6 against the inside of the windshield. When properly arranged in place, the several thumb-screws 10, with their rubber end caps 11 against the shield, are tightened to press the sealing strip into effective engagement with the windshild and to hold the frost shield against accidental movement.

To remove the frost shield in mild weather or for cleaning, it is only necessary to loosen the four thumb-screws 10. When the shield is not in use, the attaching strips 7 can be left in place or removed by unscrewing the sheet metal screws 13, as desired.

From the foregoing description taken in connection with the accompanying drawing, it will be manifest that a frost shield for motor vehicles and the like is provided that will fulfil all the necessary requirements of such a device, but as many changes could be made in the above description and many apparently widely different embodiments of the invention may be constructed within the scope of the appended claims, without departing from the spirit or scope thereof, it is intended that all matters contained in the said accompanying specification and drawing shall be interpreted as illustrative and not in a limitative or restrictive sense.

Having thus described the invention, what is claimed as new is:

1. A frost shield consisting of a transparent member, a spacing strip around its edge on one side, and a pair of universal attaching strips, each comprising a rigid member, centrally offset to accommodate said transparent member and having its ends, beyond said offset drilled with a row of perforations for attachment to the frame or moulding of a windshield.

2. For combination with an automobile windshield, a frost shield, an air sealing strip around the edge on one side thereof, a pair of attaching members perforated at opposite ends for the accommodation of sheet metal screws connecting the same to the frame or moulding of said windshield, the central part of said members being offset away from said windshield and provided with spaced, threaded perforations and thumbscrews selectively inserted in certain of said threaded perforations and operating against the back of said frost shield.

3. For a frost shield for automobile windshields and the like, a universal attaching member comprising a rigid channel strip, offset to the hollow side of the channel for about ⅗ of its length, spaced threaded perforations, through the base of said channel strip, thumb-screws selectively inserted in certain of said perforations and a row of closely spaced perforations in both ends of said strip beyond said offset to take a sheet metal screw for connecting said strip to the frame or moulding of said windshield, the unwanted or protruding ends of said strips being designed to be sawed off.

ALEXANDER INNES DOBBIN TAYLOR.